United States Patent [19]

Imashiro et al.

[11] Patent Number: 5,958,516
[45] Date of Patent: Sep. 28, 1999

[54] METHOD FOR SURFACE TREATING REINFORCING MATERIAL WITH AQUEOUS CARBODIIMIDE CONTAINING COMPOSITION

[75] Inventors: Yasuo Imashiro; Ikuo Takahashi; Naofumi Horie, all of Tokyo, Japan

[73] Assignee: Nisshinbo Industries, Inc., Tokyo, Japan

[21] Appl. No.: 08/980,405

[22] Filed: Nov. 28, 1997

Related U.S. Application Data

[62] Division of application No. 08/672,401, Jun. 21, 1996, Pat. No. 5,728,432, which is a continuation of application No. 08/510,171, Aug. 2, 1995, abandoned.

[30] Foreign Application Priority Data

Aug. 11, 1994 [JP] Japan ................................. 6-210418

[51] Int. Cl.⁶ ................................. B05D 3/00; B05D 7/24
[52] U.S. Cl. ...................... 427/389.8; 427/220; 427/221; 427/389.9
[58] Field of Search ................................. 427/384, 407.3, 427/299, 322, 220, 402, 412, 421, 178, 389.8, 389.9, 221

[56] References Cited

U.S. PATENT DOCUMENTS

| | | | |
|---|---|---|---|
| 3,556,829 | 1/1971 | Gebura | 106/288 |
| 3,896,251 | 7/1975 | Landucci | 428/290 |
| 3,922,143 | 11/1975 | Schuster et al. | 8/94.21 |
| 3,960,950 | 6/1976 | Hansen | 260/566 |
| 4,147,679 | 4/1979 | Scriven et al. | 260/29.2 TN |
| 4,542,065 | 9/1985 | Gaa | 428/375 |
| 4,596,835 | 6/1986 | Werner et al. | 521/122 |
| 4,720,398 | 1/1988 | Van Aalten et al. | 427/412 |
| 4,844,944 | 7/1989 | Graefe et al. | 427/400 |
| 4,844,955 | 7/1989 | Graefe et al. | 427/400 |
| 5,066,705 | 11/1991 | Wickert | 524/457 |
| 5,081,173 | 1/1992 | Taylor | 524/195 |
| 5,180,631 | 1/1993 | Amano | 428/236 |
| 5,373,080 | 12/1994 | Imashiro et al. | 528/67 |
| 5,468,432 | 11/1995 | Hurley et al. | 264/50 |
| 5,688,875 | 11/1997 | Sasaki et al. | 525/452 |
| 5,717,031 | 2/1998 | Degen et al. | 427/412.4 |

FOREIGN PATENT DOCUMENTS 0 537 644 A1  4/1993  European Pat. Off. .

*Primary Examiner*—Diana Dudash
*Attorney, Agent, or Firm*—Kubovcik & Kubovcik

[57] ABSTRACT

The present invention provides:

an aqueous surface-treating agent used in a process for surface treatment of reinforcing material, which comprises a carbodiimide compound as a main component, a reinforcing material surface-treated with the carbodiimide compound, and a composite material comprising a matrix and the above reinforcing material.

Said aqueous surface-treating agent has good storage stability, gives no bad effect on human health owing to no use of organic solvent and, when used for the surface treatment of a reinforcing material, can provide a surface-treated reinforcing material which can produce a composite material comprising a matrix and said surface-treated reinforcing material and having high adhesivity between the two components.

1 Claim, No Drawings

METHOD FOR SURFACE TREATING REINFORCING MATERIAL WITH AQUEOUS CARBODIIMIDE CONTAINING COMPOSITION

This application is a division of application Ser. No. 08/672,401, filed Jun. 21, 1996, now U.S. Pat. No. 5,728,432, which is a continuation of application Ser. No. 08/510,171, filed Aug. 2, 1995, and now abandoned.

BACKGROUND OF THE INVENTION

1. Field of the Invention

The present invention relates to an aqueous surface-treating agent used for surface treatment of reinforcing material, a reinforcing material surface-treated with said surface-treating agent, and a composite material comprising said reinforcing material.

2. Description of the Prior Art

In producing an intended molded product from, for example, a thermoplastic resin, it has been conducted to obtain said product in the form of a composite material which is a mixture of said thermoplastic resin and a reinforcing material, in order to allow said molded product to have improved properties. Various materials are in use as such a reinforcing material, and typical examples thereof include a glass fiber, a carbon fiber and an aramid fiber.

The glass fiber is produced by extruding a molten glass through a nozzle at a high speed, followed by solidification and winding. The glass fiber has low resistance particularly to friction and, when damaged at the surface, is broken easily. Hence, in order to prevent the damage of glass fiber yarn by contact with winder during winding after spinning or to prevent the entanglement, end breakage, raveling, fluffing, etc. of glass fiber yarn in loom, the glass fiber yarn after melt spinning is treated with a collecting agent for glass fiber to protect the fiber surface and then is wound.

As the collecting agent for glass fiber, there are used those of starch (e.g. gelatine) type or of resin emulsion type (the resin includes, for example, a polyvinyl acetate, an ethylene-vinyl acetate copolymer resin, a polyester resin, an epoxy resin, a polyacrylic acid resin and a polyurethane resin). These collecting agents for glass fiber are used during melt spinning, in the form of an aqueous system, an organic solvent system or a mixed system thereof.

In producing a composite material by reinforcing a composite material matrix with a glass fiber produced as above, the glass fiber is treated with a coupling agent (which is a compound capable of reacting with both the glass fiber and the composite material matrix) in order to enhance the adhesivity between the composite material matrix and the glass fiber. In this case, the glass fiber which has been treated with a collecting agent for glass fiber and whose surface has been coated and protected, has lower reactivity with the coupling agent owing to said treatment; therefore, it is necessary to remove the collecting agent prior to the reaction of the glass fiber with the coupling agent and enhance the reactivity of the coupling agent with the glass fiber surface.

The removal of the collecting agent from the glass fiber is generally conducted by a so-called heat-cleaning method which comprises allowing the glass fiber to stand at 400–600° C. for ten-odd hours. Consequently, the glass fiber after removal of collecting agent has a significantly low strength as compared with the glass fiber before the treatment. Therefore, the glass fiber of significantly low strength after removal of collecting agent, even after having been treated with the coupling agent, still has insufficient properties as a glass fiber used for reinforcing a composite material matrix.

A carbon fiber has a high elastic modulus and is very lightweight and, when used, for example, as a reinforcing material for thermoplastic resin, can improve the properties (e.g. mechanical strengths) of the resin and can provide an excellent material for automobile parts, mechanical parts, etc. For this carbon fiber, an epoxy resin has been used as a surface-treating agent. This epoxy resin becomes an effective surface-modifying agent for carbon fiber when the resulting carbon fiber is added to a thermosetting resin which is a composite material matrix, such as epoxy resin or phenolic resin; however, when the composite material matrix is a thermoplastic resin, the epoxy resin as surface modifier for carbon fiber often has insufficient adhesivity to the matrix and fails to sufficiently improve the mechanical strengths of the matrix.

As the surface-treating agents for carbon fiber, other than the above-mentioned epoxy resin, there were proposed a polyamide resin (Japanese Patent Application Kokai No. 106752/1978), a polyether resin (Japanese Patent Application Kokai No. 299580/1987) and a polyimide resin (Japanese Patent Application Kokai No. 40569/1989). These resins, however, are insufficient in adhesivity to the composite material matrixes used and fail to exhibit sufficient effects. There was also proposed effective surface modification by the use of a polycarbodiimide resin (Japanese Patent Application Kokai No. 311069/1993). In this approach, however, there is used, as a surface treating agent, a resin solution obtained from the synthesis using an aprotic organic solvent (e.g. Toluene); therefore, there are problems, for example, the organic solvent gives a bad effect on human health, there is a fire hazard, and the solution has a short life for stable storage.

An aramid as a heat-resistant polymer, which is a wholly aromatic polyamide wherein all of the bivalent hydrocarbon groups bonded via an amide linkage are aromatic ring groups, when made into molded materials such as fiber and the like, has a high strength, a high elastic modulus and excellent heat resistance and therefore is useful in various applications. In particular, an aramid fiber, having a high strength and a high elastic modulus, is added as a reinforcing material to various thermoplastic resins, rubbers and thermosetting resins, and the resulting compositions are under evaluation for mechanical properties, heat resistance, etc.

According to the conventional technique, however, a combination of an aramid fiber and a matrix is unable to provide a composite material with good mechanical properties because they have inferior adhesivity to each other. Moreover, the aramid, whose amide group has an ability of forming a strong hydrogen bond, has high affinity between molecules; therefore, when the aramid is mixed with a composite material matrix, it is difficult to obtain a composition in which the aramid fiber is dispersed uniformly in the matrix.

In order to eliminate the above drawbacks of the aramid, the following proposals were made; however, no sufficient adhesivity has been obtained yet between the aramid and the matrix.

(1) Hydrolyze the surface of an aramid resin with an acid or a base and then introduce an amino group.
(2) Add an epoxy compound to the surface of an aramid fiber and then react the resulting aramid fiber with a matrix resin used.
(3) Form, on the surface of an aramid fiber, a chemical structure similar to that of a matrix resin used.

(4) Subject the surface of an aramid fiber to a plasma treatment.

(5) Use a coupling agent.

SUMMARY OF THE INVENTION

In order to solve the above-mentioned problems of the prior art, the objects of the present invention are to provide an aqueous surface-treating agent used for the surface treatment of a reinforcing material to improve the adhesivity of the reinforcing material to a composite material matrix and obtain a composite material of excellent properties, which has good storage stability and gives no bad effect on human health because of no organic solvent contained therein; a reinforcing material surface-treated with said surface-treating agent; and a composite material comprising a matrix and said reinforcing material.

According to the present invention, there are provided:

an aqueous surface-treating agent used for surface treatment of reinforcing material, which comprises a carbodiimide compound as a main component, a reinforcing material surface-treated with the above aqueous surface-treating agent, and a composite material comprising a matrix and the above reinforcing material.

DETAILED DESCRIPTION OF THE INVENTION

The present invention is hereinafter described in detail.

The carbodiimide compound, which is the main component of the present aqueous surface-treating agent for surface treatment of reinforcing material, can be any carbodiimide compound as long as it can be dispersed in an aqueous solvent by the use of a dispersing agent. It includes, for example, an aromatic or aliphatic carbodiimide compound represented by the following general formula $$R_2\text{—NCN—}(R_1\text{—NCN})_n\text{—}R_2$$

(wherein $R_1$ is a residue of a diisocyanate compound selected from the group consisting of m- or p-tetramethylxylylene diisocyanate, 4,4'-dicyclohexylmethane diisocyanate, isophorone diisocyanate, 4,4'-diphenylmethane diisocyanate, and 2,4- or 2,6-tolylene diisocyanate;

$R_2$ is a residue of a monoisocyanate compound selected from the group consisting of cyclohexyl isocyanate, phenyl isocyanate, and butyl isocyanate;

and n is an integer of 2 to 30). The dispersing agent used for dispersing the carbodiimide compound in an aqueous solvent to obtain the present aqueous surface-treating agent, can be an emulsifier or the like.

With respect to the n (average polymerization degree) of the above formula, when n is less than 2, the number of carbodiimide groups is insufficient and no satisfactory surface-treating agent can be obtained. When n is more than 30, there occurs solidification or gelling of reaction product during the synthesis of carbodiimide, which is undesirable.

The carbodiimide compound as main component of the present aqueous surface-treating agent for reinforcing material may be a water-soluble or self-emulsifiable type. Such a carbodiimide compound includes, for example, a carbodiimide compound in which a hydrophilic segment has been introduced at the terminals, represented by the following general formula $$Z\text{—OOC—NH—}(R_3\text{—NCN})_n\text{—}R_3\text{—NH—COO—Z}$$

(wherein $R_3$ is a residue of a diisocyanate compound selected from the group consisting of m- or p-tetramethylxylylene diisocyanate, 4,4'-dicyclohexylmethane diisocyanate, and isophorone diisocyanate;

Z is a hydrophilic segment; and n is an integer of 2 to 30). Such a carbodiimide compound is dissolved in an aqueous solvent or self-emulsified in said aqueous solvent, whereby the present aqueous surface-treating agent can be obtained.

With respect to the n (average polymerization degree) of the above formula, when n is less than 2, the number of carbodiimide groups is insufficient and no satisfactory surface-treating agent can be obtained. When n is more than 30, there occurs solidification or gelling of reaction product during the synthesis of carbodiimide, which is undesirable. Incidentally, the type (water-soluble or self-emulsifiable) of the above carbodiimide compound is determined mainly by the value of n.

In the above general formula, Z (hydrophilic segment) is not particularly restricted but is preferably one of the followings.

(a) Anionic Segment

Firstly, Z can be a residue of an alkylsulfonic acid salt having at least one reactive hydroxyl group, represented by the following general formula $$R_5\text{—}SO_3\text{—}R_4\text{—OH}$$

(wherein $R_4$ is an alkylene group having 1–10 carbon atoms, and $R_5$ is an alkali metal). Specific examples of the alkylsulfonic acid salt are sodium hydroxyethanesulfonate and sodium hydroxypropanesulfonate with the latter being particularly preferred.

(b) Cationic Segment

Z can also be a quaternary salt of a residue of a dialkylaminoalcohol represented by the following general formula $$(R_6)_2\text{—N—}R_7\text{—OH}$$

(wherein $R_6$ is a lower alkyl group having 1–4 carbon atoms, and $R_7$ is an alkylene or oxyalkylene group having 1–10 carbon atoms). Specific examples of the dialkylaminoalcohol are 2-dimethylaminoethanol, 2-diethylaminoethanol, 3-dimethylamino-1-propanol, 3-diethylamino-1-propanol, 3-diethyl amino-2-propanol, 5-diethylamino-2-propanol and 2-(di-n-butylamino)ethanol. Of these, 2-dimethylaminoethanol is particularly preferred.

The hydrophilic segment derived from the dialkylaminoalcohol is obtained by reacting the dialkylaminoalcohol with an isocyanate-terminated carbodiimide and quaternizing the reaction product with a well-known quaternizing agent such as dimethyl sulfate, methyl p-toluenesulfonate or the like, and is represented by the following general formula $$(R_6)_2\text{—}\underset{\underset{R'}{|}}{N}\text{—}R_7$$

(wherein $R_6$ and $R_7$ have the same definitions as given above, and R' is a group which is part of the quaternizing agent used).

(c) Nonionic Segment

Z can also be a residue of a poly(alkylene oxide) which has at least one reactive hydroxyl group and which is blocked with an alkoxy group at one terminal. Said poly (alkylene oxide) is represented by the following general formula $$R_8—(O—CHR_9—CH_2)_m—OH$$

(wherein $R_8$ is a lower alkyl group having 1–4 carbon atoms, $R_9$ is a hydrogen atom or a methyl group, and m is an integer of 4 to 30). Specific examples of the poly(alkylene oxide) are poly (ethylene oxide) monomethyl ether, poly(ethylene oxide) monoethyl ether, poly(ethylene oxide-propylene oxide) monoethyl ether. Of these, poly(ethylene oxide) monomethyl ether is particularly preferred.

At least one carbodiimide compound such as mentioned above is dispersed or dissolved or emulsified in an aqueous solvent, whereby the present aqueous surface-treating agent for surface treatment of reinforcing material can be obtained. The aqueous solvent used in the present invention includes water, hydrous alcohol, etc. There is no particular restriction as to the amount of the carbodiimide compound used, and the compound can be diluted to an appropriate concentration at which the resulting surface-treating agent can be handled conveniently. The concentration is, for example, 1–40% by weight, particularly preferably 5–20% by weight.

The aqueous surface-treating agent of the present invention may further comprise, as necessary, additives such as dye, pigment, antistatic agent, lubricant and the like.

By treating a reinforcing material for composite material with the present aqueous surface-treating agent obtained as above, there can be obtained a reinforcing material surface-treated with the present aqueous surface-treating agent. There is no particular restriction as to the reinforcing material, and the reinforcing material can be any as long as it can be used together with a matrix for composite material. Examples thereof are inorganic or organic powders or fibers, and specific examples are powders or fibers of glass, rock wool, alumina, talc, zeolite, ferrite, asbestos, etc. as well as a carbon fiber and an aramid fiber.

The amount of the surface-treating agent used to the reinforcing material can be determined depending upon the kind of the reinforcing material, the application of the composite material using the reinforcing material, etc. However, the amount is, for example, 0.1–30% by weight, preferably 0.5–10% by weight.

There is no particular restriction as to the method for applying the surface-treating agent to the reinforcing material. The method can be appropriately selected from known methods such as immersion of reinforcing material in surface-treating agent, spraying of surface-treating agent on reinforcing material, and the like.

In applying the present aqueous surface-treating agent to a reinforcing material, it is preferable to use a coupling agent or to subject the reinforcing material to a preliminary surface treatment because the adhesivity between the present surface-treating agent and the reinforcing material can be enhanced thereby. There is no particular restriction as to the method of the preliminary surface treatment, and there can be used any ordinary methods such as liquid-phase oxidation [oxidation with chemical (e.g. nitric acid or permanganic acid/sulfuric acid), electrolytic oxidation , etc.] and gas-phase oxidation [heating in gas phase (e.g. air, oxygen or ozone), plasma treatment, corona discharge, etc.].

By adding the thus-obtained reinforcing material (surface-treated with the present aqueous surface-treating agent) to a matrix for composite material, there can be obtained a composite material comprising a matrix and the present reinforcing material. There is no particular restriction as to the matrix, and tile matrix can be any as long as it can be used as a matrix. Examples thereof are a thermoplastic resin, a thermo-setting resin and a rubber. Specific examples are a polyolefin resin, a polyester resin, a polyamide resin, an epoxy resin, a phenolic resin, a styrene-butadiene rubber, a chloroprene rubber and a natural rubber.

The amount of the reinforcing material used to the matrix can be determined depending upon, for example, the kind of the composite material obtained and the application thereof. The amount is, for example, 5–70% by weight based on the composite material obtained. When the amount is less than 5% by weight, no meritorious effect of the reinforcing material is exhibited. When the amount is more than 70% by weight, the mixing between the matrix and the reinforcing material is non-uniform and the resulting composite material tends to have low mechanical strengths and rigidity.

It is generally known that carbodiimide bond causes self-crosslinking when heated and further reacts with active hydrogen compounds. The aqueous carbodiimide contained in the present aqueous surface-treating agent, contains carbodiimide bond; therefore, when heated and applied to a carbon fiber, the carbodiimide reacts with the carboxyl group of the carbon fiber and adheres to the surface of the carbon fiber, moreover causes self-crosslinking and covers said surface, and thus gives rise to the surface modification of the carbon fiber. Similarly, the carbodiimide, when applied to a glass fiber, reacts with the silanol group of the glass fiber and adheres to the surface of the glass fiber, moreover causes self-crosslinking and covers said surface, and thus gives rise to the surface modification of the glass fiber. The carbodiimide, when applied to an aramid fiber, causes self-crosslinking and covers the surface of the aramid fiber, and thus gives rise to the surface modification of the aramid fiber. Further, the carbodiimide bond is reactive with a matrix for composite material and bonds thereto; accordingly, the reinforcing material surface-treated with the present aqueous surface-treating agent containing a carbodiimide has sufficient a adhesivity to a matrix for composite material.

In general, composite materials have high strengths owing to the synergistic effect of the strength possessed by the matrix and the strength possessed by the reinforcing material. In this case, the strength of composite material is greatly influenced by the condition of adhesion between the matrix and the reinforcing material at their interface. Therefore, the adhesivity of the surface-treating agent used for the surface treatment of the reinforcing material can be rated by the strength of the composite material containing the reinforcing material. In the following Examples, the adhesivity of surface-treating agent was rated by the bonding and tensile strengths of the composite material produced using said surface-treating agent.

The present invention is hereinafter described in more detail with reference to Examples. Synthesis Examples 1–23 are shown first, and then Examples 1–64 and Comparative Examples 1–16 are shown.

Synthesis Example 1

[Aqueous carbodiimide 1 (aliphatic carbodiimide dispersion)]

549 g of m-tetramethylxylylene diisocyanate (TMXDI), 49.5 g of n-butyl isocyanate and 5.99 g of a carbodiimidization catalyst [3-methyl-1-phenyl-2-phospholene-1-oxide (the same applies also in later Synthesis Examples)] were reacted at 180° C. for 48 hours to obtain m-tetramethylxylylenecarbodiimide (polymerization degree=10). To 200 g of this carbodiimide resin was gradually added 1,800 g of distilled water in which 1 g of a nonylphenol type nonionic surfactant [Nonipol (trade name) produced by Sanyo Chemical Industries, Ltd. (the same applies also in later Synthesis Examples)] had been dissolved, to obtain a carbodiimide,dispersion (resin concentration=10% by weight).

Synthesis Example 2
[Aqueous carbodiimide 2 (aliphatic carbodiimide dispersion)]

590 g of 4,4'-dicyclohexylmethane diisocyanate (HMDI), 62.6 g of cyclohexyl isocyanate and 6.12 g of a carbodiimidization catalyst were reacted at 180° C. for 48 hours to obtain 4,4'-dicyclohexylmethanecarbodiimide (polymerization degree=10). This carbodiimide resin was ground thoroughly. To 200 g of the ground carbodiimide resin was gradually added 1,800 g of distilled water in which 1 g of a nonylphenol type nonionic surfactant had been dissolved, to obtain a carbodiimide dispersion (resin concentration=10% by weight).

Synthesis Example 3
[Aqueous carbodiimide 3 (aliphatic carbodiimide dispersion)]

500 g of isophorone diisocyanate (IPDI), 62.6 g of cyclohexyl isocyanate and 5.63 g of a carbodiimidization catalyst were reacted at 180° C. for 20 hours to obtain isophoronecarbodiimide (polymerization degree=10). This carbodiimide resin was ground thoroughly. To 200 g of the ground carbodiimide resin was gradually added 1,800 g of distilled water in which 1 g of a nonylphenol type nonionic surfactant had been dissolved, to obtain a carbodiimide dispersion (resin concentration=10% by weight).

Synthesis Example 4
[Aqueous carbodiimide 4 (aromatic carbodiimide dispersion)]

563 g of 4,4'-diphenylmethane diisocyanate (MDI) and 59.5 g of phenyl isocyanate were reacted in the presence of 1.5 g of a carbodiimidization catalyst in 2,458 g of Perclene at 120° C. for 4 hours to obtain a carbodiimide solution (polymerization degree=10). The carbodiimide solution was cooled and made into a slurry and then spray-dried to obtain a carbodiimide powder. To 200 g of this carbodiimide powder was gradually added 1,800 g of distilled water in which 1 g of a nonylphenol type nonionic surfactant had been dissolved, to obtain a carbodiimide dispersion (resin concentration=10% by weight).

Synthesis Example 5
[Aqueous carbodiimide 5 (aromatic carbodiimide dispersion)]

348 g of a 2,6-tolylene diisocyanate/2,4-tolylene diisocyanate mixture (20:80) (80-TDI) and 119 g of phenyl isocyanate were reacted in the presence of 0.93 g of a carbodiimidization catalyst at 130° C. for 1 hour to obtain a carbodiimide resin (polymerization degree=5). The carbodiimide resin was ground thoroughly to obtain a carbodiimide powder. To 200 g of this carbodiimide powder was gradually added 1,800 g of distilled water in which 1 g of a nonylphenol type nonionic surfactant had been dissolved, to obtain a carbodiimide dispersion (resin concentration=10% by weight).

Synthesis Example 6
[Aqueous carbodiimide 6 (aliphatic anionic carbodiimide emulsion)]

700 g of m-tetramethylxylylene diisocyanate (TMXDI) was reacted with 14 g of a carbodiimidization catalyst at 180° C. for 48 hours to obtain an isocyanate-terminated tetramethylxylylenecarbodiimide (polymerization degree= 10). 224.4 g of the carbodiimide and 32.4 g of sodium hydroxypropanesulfonate were reacted at 100° C. for 24 hours. Thereto was gradually added 2,311 g of distilled water at 80° C. to obtain a carbodiimide emulsion (resin concentration=10% by weight).

Synthesis Example 7
[Aqueous carbodiimide 7 (aqueous solution of aliphatic anionic carbodiimide)]

700 g of m-tetramethylxylylene diisocyanate (TMXDI) was reacted with 14 g of a carbodiimidization catalyst at 180° C. for 30 hours to obtain an isocyanate-terminated tetramethylxylylenecarbodiimide (polymerization degree= 5). 124.4 g of the carbodiimide and 32 .4 g of sodium hydroxypropanesulfonate were reacted at 100° C. for 24 hours. Thereto was gradually added 1,411 g of distilled water at 80° C. to obtain a yellow transparent carbodiimide solution (resin concentration=10% by weight).

Synthesis Example 8
[Aqueous carbodiimide 8 (aliphatic anionic carbodiimide emulsion)]

700 g of 4,4'-dicyclohexylmethane diisocyanate (HMDI) was reacted with 14 g of a carbodiimidization catalyst at 180° C. for 48 hours to obtain an isocyanate-terminated 4,4'-dicyclohexylmethanecarbodiimide (polymerization degree=10). 224.4 g of the carbodiimide and 32.4 g of sodium hydroxypropanesulfonate were reacted at 100° C. for 24 hours. Thereto was gradually added 2,349 g of distilled water at 80° C. to obtain a carbodiimide emulsion (resin concentration=10% by weight).

Synthesis Example 9
[Aqueous carbodiimide 9 (aqueous solution of aliphatic anionic carbodiimide)]

700 g of 4,4'-dicyclohexylmethane diisocyanate (HMDI) was reacted with 14 g of a carbodiimidization catalyst at 180° C. for 48 hours to obtain an isocyanate-terminated 4,4'-dicyclohexylmethanecarbodiimide (polymerization degree=4). 91.6 g of the carbodiimide and 32.4 g of sodium hydroxypropanesulfonate were reacted at 100° C. for 24 hours. Thereto was gradually added 1,116 g of distilled water at 80° C. to obtain a yellow transparent carbodiimide solution (resin concentration=10% by weight).

Synthesis Example 10
[Aqueous carbodiimide 10 (aliphatic anionic carbodiimide emulsion)]

700 g of isophorone diisocyanate (IPDI) was reacted with 14 g of a carbodiimidization catalyst at 180° C. for 20 hours to obtain an isocyanate-terminated isophoronecarbodiimide (polymerization degree=10). 200.2 g of the carbodiimide and 32.4 g of sodium hydroxypropanesulfonate were reacted at 100° C. for 24 hours. Thereto was gradually added 2,093 g of distilled water at 80° C. to obtain a carbodiimide emulsion (resin concentration=10% by weight).

Synthesis Example 11
[Aqueous carbodiimide 11 (aqueous solution of aliphatic anionic carbodiimide)]

700 g of isophorone diisocyanate (IPDI) was reacted with 14 g of a carbodiimidization catalyst at 180° C. for 14 hours to obtain an isocyanate-terminated isophoronecarbodiimide (polymerization degree=5). 110.0 g of the carbodiimide and 32.4 g of sodium hydroxypropanesulfonate were reacted at 100° C. for 24 hours. Thereto was gradually added 1,282 g

Synthesis Example 12
[Aqueous carbodiimide 12 (aliphatic cationic carbodiimide emulsion)]

700 g of m-tetramethylxylylene diisocyanate (TMXDI) was reacted with 14 g of a carbodiimidization catalyst at 180° C. for 48 hours to obtain an isocyanate-terminated tetramethylxylenecarbodiimide (polymerization degree=10). 112.2 g of the carbodiimide and 8.9 g of 2-dimethylaminoethanol were reacted at 80° C. for 24 hours. Thereto was added 18.6 g of methyl p-toluenesulfonate, followed by stirring for 1 hour for quaternization. Thereto was gradually added 1,257 g of distilled water to obtain a carbodiimide emulsion (resin concentration=10% by weight).

Synthesis Example 13
[Aqueous carbodiimide 13 (aqueous solution of aliphatic cationic Carbodiimide)]

700 g of m-tetramethylxylylene diisocyanate (TMXDI) was reacted with 14 g of a carbodiimidization catalyst at 180° C. for 30 hours to obtain an isocyanate-terminated m-tetamethylxylylenecarbodiimide (polymerization degree=5). 62.2 g of the carbodiimide and 8.9 g of 2-dimethylaminoethanol were reacted at 80° C. for 24 hours. Thereto was added 18.6 g of methyl p-toluenesulfonate, followed by stirring for 1 hour for quaternization. Thereto was gradually added 717 g of distilled water to obtain a yellow transparent carbodiimide solution (resin concentration=10% by weight).

Synthesis Example 14
[Aqueous carbodiimide 14 (aliphatic cationic carbodiimide emulsion)]

700 g of 4,4'-dicyclohexylmethane diisocyanate (HMDI) was reacted with 14 g of a carbodiimidization catalyst at 180° C. for 48 hours to obtain an isocyanate-terminated 4,4'-dicyclohexylmethanecarbodiimide (polymerization degree=10). 122.1 g of the carbodiimide and 8.9 g of 2-dimethylaminoethanol were reacted at 80° C. for 24 hours. Thereto was added 18.6 g of methyl-p-toluenesulfonate, followed by stirring for 1 hour for quaternization. Thereto was gradually added 1,346 g of distilled water to obtain a carbodiimide emulsion (resin concentration=10% by weight).

Synthesis Example 15
[Aqueous carbodiimide 15 (aqueous solution of aliphatic cationic carbodiimide)]

700 g of 4,4'-dicyclohexylmethane diisocyanate (HMDI) was reacted with 14 g of a carbodiimidization catalyst at 180° C. for 24 hours to obtain an isocyanate-terminated 4,4'-dicyclohexylmethanecarbodiimide (polymerization degree=4). 56.7 g of the carbodiimide and 8.9 g of 2-dimethylaminoethanol were reacted at 80° C. for 24 hours. Thereto was added 18.6 g of methyl-p-toluenesulfonate, followed by stirring for 1 hour for quaternization. Thereto was gradually added 758 g of distilled water to obtain a yellow transparent carbodiimide solution (resin concentration=10% by weight).

Synthesis Example 16
[Aqueous carbodiimide 16 (aliphatic cationic carbodiimide emulsion)]

700 g of isophorone diisocyanate (IPDI) was reacted with 14 g of a carbodiimidization catalyst at 180° C. for 20 hours to obtain an isocyanate-terminated isophoronecarbodiimide (polymerization degree=10). 100.1 g of the carbodiimide and 8.9 g of 2-dimethylaminoethanol were reacted at 80° C. for 24 hours. Thereto was added 18.6 g of methyl-p-toluenesulfonate, followed by stirring for 1 hour for quaternization. Thereto was gradually added 1,148 g of distilled water to obtain a carbodiimide emulsion (resin concentration=10% by weight).

Synthesis Example 17
[Aqueous carbodiimide 17 (aqueous solution of aliphatic cationic carbodiimide)]

700 g of isophorone diisocyanate (IPDI) was reacted with 14 g of a carbodiimidization catalyst at 180° C. for 14 hours to obtain an isocyanate-terminated isophoronecarbodiimide (polymerization degree=4). 93.4 g of the carbodiimide and 17.8 g of 2-dimethylaminoethanol were reacted at 80° C. for 24 hours. Thereto was added 7.2 g of methyl-p-toluenesulfonate, followed by stirring for 1 hour for quaternization. Thereto was gradually added 1,336 g of distilled water to obtain a yellow transparent carbodiimide solution (resin concentration=10% by weight).

Synthesis Example 18
[Aqueous carbodiimide 18 (aliphatic nonionic carbodiimide emulsion)]

700 g of m-tetramethylxylylene diisocyanate (TMXDI) was reacted with 14 g of a carbodiimidization catalyst at 180° C. for 48 hours to obtain an isocyanate-terminated tetramethylxylylenecarbodiimide (polymerization degree=10). 224.4 g of the carbodiimide was reacted with 59.2 g of a poly (oxyethylene) monomethyl ether (polymerization degree m=6) at 100° C. for 48 hours. Thereto was gradually added 2,552 g of distilled water at 50° C. to obtain a carbodiimide emulsion (resin concentration=10% by weight).

Synthesis Example 19
[Aqueous carbodiimide 19 (aqueous solution of aliphatic nonionic carbodiimide)]

700 g of m-tetramethylxylylene diisocyanate (TMXDI) was reacted with 14 g of a carbodiimidization catalyst at 180° C. for 30 hours to obtain an isocyanate-terminated tetramethylxylylenecarbodiimide (polymerization degree=5). 124.4 g of the carbodiimide was reacted with 59.2 g of a poly (oxyethylene) monomethyl ether (polymerization degree m=6) at 100° C. for 48 hours. Thereto was gradually added 1,652 g of distilled water at 50° C. to obtain a yellow transparent carbodiimide solution (resin concentration=10% by weight).

Synthesis Example 20
[Aqueous carbodiimide 20 (aliphatic nonionic carbodiimide emulsion)]

700 g of 4,4'-dicyclohexylmethane diisocyanate (HMDI) was reacted with 14 g of a carbodiimidization catalyst at 180° C. for 48 hours to obtain an isocyanate-terminated 4,4'-dicyclohexylmethanecarbodiimide (polymerization degree=10). 244.2 g of the carbodiimide was reacted with 59.2 g of a poly(oxyethylene) monomethyl ether (polymerization degree m=6) at 100° C. for 48 hours. Thereto was gradually added 2,731 g of distilled water at 50° C. to obtain a carbodiimide emulsion (resin concentration=10% by weight).

Synthesis Example 21
[Aqueous carbodiimide 21 (aqueous solution of aliphatic nonionic carbodiimide)]

700 g of 4,4'-dicyclohexylmethane diisocyanate (HMDI) was reacted with 14 g of a carbodiimidization catalyst at 180° C. for 24 hours to obtain an isocyanate-terminated 4,4'-dicyclohexylmethanecarbodiimide (polymerization degree=4). 113.4 g of the carbodiimide was reacted with 59.2 g of a poly (oxyethylene) monomethyl ether (polymerization degree m=6) at 100° C. for 48 hours. Thereto was gradually added 1,553 g of distilled water at 50° C. to obtain a yellow transparent carbodiimide solution (resin concentration=10% by weight).

Synthesis Example 22

[Aqueous carbodiimide 22 (aliphatic nonionic carbodiimide emulsion)]

700 g of isophorone diisocyanate (IPDI) was reacted with 14 g of a carbodiimidization catalyst at 180° C. for 20 hours to obtain an isocyanate-terminated isophoronecarbodiimide (polymerization degree=10). 200.2 g of the carbodiimide was reacted with 59.2 g of a poly(oxyethylene) monomethyl ether (polymerization degree m=6) at 100° C. for 48 hours. Thereto was gradually added 2,335 g of distilled water at 50° C. to obtain a carbodiimide emulsion (resin concentration= 10% by weight).

Synthesis Example 23

[Aqueous carbodiimide 23 (aqueous solution of aliphatic nonionic carbodiimide)]

700 g of isophorone diisocyanate (IPDI) was reacted with 14 g of a carbodiimidization catalyst at 180° C. for 140 hours to obtain an isocyanate-terminated isophoronecarbodiimide (polymerization degree=5). 111.2 g of the carbodiimide was reacted with 59.2 g of a poly(oxyethylene) monomethyl ether (polymerization degree m=6) at 100° C. for 24 hours. Thereto was gradually added 1,373 g of distilled water at 50° C. to obtain a yellow transparent carbodiimide solution (resin concentration=10% by weight).

As to the above Synthesis Examples, polymerization degree of carbodiimide obtained, resin concentration in carbodiimide fluid obtained, condition of carbodiimide fluid obtained, etc. are shown in the following Table 1.

TABLE 1

| Synthesis Example | Raw material diisocyanate | Polymerization degree of carbodiimide | Raw material for terminal segment | Additive | Resin Concentration (%) | Fluid condition |
|---|---|---|---|---|---|---|
| 1 | TMXDI | 10 | n-Butyl isocyanate | Emulsifier | 10 | Dispersion |
| 2 | HMDI | 10 | Cyclohecyl isocyanate | " | 10 | " |
| 3 | IPDI | 10 | " | " | 10 | " |
| 4 | MDI | 10 | Phenyl isocyanate | " | 10 | " |
| 5 | TDI | 10 | " | " | 10 | " |
| 6 | TMXDI | 10 | Sodium hyfroxypropanesulfonate | Not used | 10 | Emulsion |
| 7 | TMXDI | 5 | " | | 10 | Transparent |
| 8 | HMDI | 10 | " | | 10 | Emulsion |
| 9 | HMDI | 4 | " | | 10 | Transparent |
| 10 | IPDI | 10 | " | | 10 | Emulsion |
| 11 | IPDI | 5 | " | | 10 | Transparent |
| 12 | TMXDI | 10 | 2-Dimethylaminoethanol | Quaternizing agent | 10 | Emulsion |
| 13 | TMXDI | 5 | " | " | 10 | Transparent |
| 14 | HMDI | 10 | " | " | 10 | Emulsion |
| 15 | HMDI | 4 | " | " | 10 | Transparent |
| 16 | IPDI | 10 | " | " | 10 | Emulsion |
| 17 | IPDI | 5 | " | " | 10 | Transparent |
| 18 | TMXDI | 10 | Poly(oxyethylene)monoethyl ether (polymerization degree = 6) | Not used | 10 | Emulsion |
| 19 | TMXDI | 5 | Poly(oxyethylene)monoethyl ether (polymerization degree = 6) | | 10 | Transparent |
| 20 | HMDI | 10 | Poly(oxyethylene)monoethyl ether (polymerization degree = 6) | | 10 | Emulsion |
| 21 | HMDI | 4 | Poly(oxyethylene)monoethyl ether (polymerization degree = 6) | | 10 | Transparent |
| 22 | IPDI | 10 | Poly(oxyethylene)monoethyl ether (polymerization degree = 6) | | 10 | Emulsion |
| 23 | IPDI | 5 | Poly(oxyethylene)monoethyl ether (polymerization degree = 6) | | 10 | Transparent |

EXAMPLE 1

Spinning of molten glass was conducted while the resulting glass filaments each of 10–20 μm in diameter were being sprayed with a surface-treating agent which was the aqueous carbodiimide solution obtained in Synthesis Example 1. The filaments were collected and made into a strand, and the strand was wound in a coke form and dried at 80° C. for 1 hour. The amount of the surface-treating agent adhered was 0.5% by weight.

The strand was chopped and made into chopped strands each of 20 mm in length. The chopped strands were arranged at random in a mat form to obtain a chopped strand mat. The chopped strand mat was impregnated with a composite material matrix which was a polyethylene terephthalate resin (PET), to obtain a sheet. material of 3 mm in thickness, made of a glass fiber-reinforced polyethylene terephthalate resin (reinforcing material: 40 wt %). Test pieces conforming to JIS K 6911 were cut out from the sheet and measured for properties. The results of measurements are shown in Table 2.

EXAMPLES 2–4

The procedure of Example 1 was repeated except that the surface-treating agent was changed to one of the aqueous carbodiimides obtained in Synthesis examples 7, 14 and 21. The results of measurements are shown in Table 2.

Comparative Example 1

The procedure of Example 1 was repeated except that the surface-treating agent was changed to γ-glycidoxypropyl-methoxysilane. The results of measurements are shown in Table 2.

EXAMPLES 5–8

The procedure of Example 1 was repeated except that the matrix resin was changed to an epoxy resin and the surface-treating agent was changed to one of the aqueous carbodiimides obtained in Synthesis Examples 2, 8, 15 and 22. The results of measurements are shown in Table 2.

Comparative Example 2

The procedure of Example 5 was repeated except that the surface-treating agent was changed to γ-glycidoxypropyl-methoxysilane. The results of measurements are shown in Table 2.

EXAMPLES 9–12

The procedure of Example 1 was repeated except that the matrix resin was changed to a polypropylene (PP) and the surface-treating agent was changed to one of the aqueous carbodiimides obtained in Synthesis Examples 3, 9, 16 and 23. The results of measurements are shown in Table 2.

Comparative Example 3

The procedure of Example 9 was repeated except that the surface-treating agent was changed to γ-glycidoxypropyl-methoxysilane. The results of measurements are shown in Table 2.

EXAMPLES 13–16

The procedure of Example 1 was repeated except that the matrix resin was changed to a polybutylene terephthalate (PBT) and the surface-treating agent was changed to one of the aqueous carbodiimides obtained in Synthesis Examples 4, 10, 17 and 18. The results of measurements are shown in Table 2.

Comparative Example 4

The procedure of Example 13 was repeated except that the surface-treating agent was changed to γ-glycidoxypropylmethoxysilane. The results of measurements are shown in Table 2.

EXAMPLES 17–20

The procedure of Example 1 was repeated except that the matrix resin was changed to a nylon 6, 6 and the surface-treating agent was changed to one of the aqueous carbodiimides obtained in Synthesis Examples 5, 11, 12 and 19. The results of measurements are shown in Table 2.

Comparative Example 5

The procedure of Example 17 was repeated except that the surface-treating agent was changed to γ-glycidoxypropyl-methoxysilane. The results of measurements are shown in Table 2.

EXAMPLES 21–24

The procedure of Example 1 was repeated except that the matrix resin was changed to a phenolic resin and the surface-treating agent was changed to one of the aqueous carbodiimides obtained in Synthesis Examples 1, 6, 13 and 20. The results of measurements are shown in Table 2.

Comparative Example 6

The procedure of Example 21 was repeated except that the surface-treating agent was changed to γ-glycidoxypropyl-methoxysilane. The results of measurements are shown in Table 2.

EXAMPLES 25–28

The procedure of Example 1 was repeated except that the matrix resin was changed to a styrene-butadiene rubber (SBR) and the surface-treating agent was changed to one of the aqueous carbodiimides obtained in Synthesis Examples 2, 7, 14 and 21. The results of measurements are shown in Table 2.

Comparative Example 4

The procedure of Example 25 was repeated except that the surface-treating agent was changed to γ-glycidoxypropyl-methoxysilane. The results of measurements are shown in Table 2.

TABLE 2

| | Surface-treating agent | Synthesis Example | Matrix resin | Tensile strength (kg/mm$^2$) | Bending strength (kg/mm$^2$) |
|---|---|---|---|---|---|
| Example 1 | Carbodiimide compound | 1 | PET | 17.3 | 27.8 |
| 2 | " | 7 | " | 16.2 | 26.8 |
| 3 | " | 14 | " | 16.9 | 27.4 |
| 4 | " | 21 | " | 16.0 | 26.4 |
| Comparative Example 1 | Silane coupling agent | | " | 12.9 | 22.3 |
| Example 5 | Carbodiimide compound | 2 | Epoxy resin | 11.4 | 13.2 |
| 6 | " | 8 | " | 10.9 | 13.1 |
| 7 | " | 15 | " | 10.6 | 12.7 |
| 8 | " | 22 | " | 10.7 | 12.9 |
| Comparative Example 2 | Silane coupling agent | | " | 8.2 | 10.9 |
| Example 9 | Carbodiimide compound | 3 | PP | 13.3 | 19.1 |
| 10 | " | 9 | " | 12.6 | 18.6 |
| 11 | " | 16 | " | 12.2 | 18.1 |
| 12 | " | 23 | " | 12.7 | 18.6 |

TABLE 2-continued

|  | Surface-treating agent | Synthesis Example | Matrix resin | Tensile strength (kg/mm$^2$) | Bending strength (kg/mm$^2$) |
|---|---|---|---|---|---|
| Comparative Example 3 | Silane coupling agent |  | " | 11.2 | 16.0 |
| Example 13 | Carbodiimide compound | 4 | PBT | 13.1 | 19.8 |
| 14 | " | 10 | " | 11.9 | 18.5 |
| 15 | " | 17 | " | 12.1 | 18.7 |
| 16 | " | 18 | " | 12.8 | 19.2 |
| Comparative Example 4 | Silane coupling agent |  | " | 10.5 | 16.8 |
| Example 17 | Carbodiimide compound | 5 | Nylon 6,6 | 17.4 | 27.9 |
| 18 | " | 11 | " | 16.2 | 26.3 |
| 19 | " | 12 | " | 16.0 | 26.2 |
| 20 | " | 19 | " | 16.9 | 27.6 |
| Comparative Example 5 | Silane coupling agent |  | " | 13.7 | 23.5 |
| Example 21 | Carbodiimide compound | 1 | Phenolic resin | 15.4 | 22.6 |
| 22 | " | 8 | " | 14.3 | 21.4 |
| 23 | " | 13 | " | 14.6 | 21.7 |
| 24 | " | 20 | " | 15.2 | 22.1 |
| Comparative Example 6 | Silane coupling agent |  | " | 12.6 | 19.6 |
| Example 25 | Carbodiimide compound | 2 | SBR | 5.3 |  |
| 26 | " | 7 | " | 4.7 |  |
| 27 | " | 14 | " | 5.0 |  |
| 28 | " | 21 | " | 4.6 |  |
| Comparative Example 7 | Silane coupling agent |  | " | 4.0 |  |

EXAMPLE 29

Surface-treated carbon fiber tows (fiber diameter=7 μm, 12,000 filaments) were sprayed with a surface-treating agent which was the aqueous carbodiimide solution obtained in Synthesis Example 3, and then were collected and made into a strand. The strand was wound in a cake form and dried at 80° C. for 1 hour. The amount of the surface-treating agent adhered was 0.5% by weight.

The strand was chopped and made into chopped strands each of 20 mm in length. The chopped strands were arranged at random in a mat form to obtain a chopped strand mat. The chopped strand mat was impregnated with a composite material matrix which was a polyethylene terephthalate resin (PET), to obtain a sheet material of 3 mm in thickness, made of a carbon fiber-reinforced polyethylene terephthalate resin. Test pieces conforming to JIS K 6911 were cut out from the sheet and measured for properties. The results of measurements are shown in Table 3.

EXAMPLES 30–32

The procedure of Example 29 was repeated except that the surface-treating agent was changed to one of the aqueous carbodiimides obtained in Synthesis Examples 8, 15 and 22. The results of measurements are shown in Table 3.

Comparative Example 8

The procedure of Example 29 was repeated except that the surface-treating agent was changed to γ-glycidoxypropyl-methoxysilane. The results of measurements are shown in Table 3.

EXAMPLES 33–36

The procedure of Example 29 was repeated except that the matrix resin was changed to an epoxy resin and the surface-treating agent was changed to one of the aqueous carbodiimides obtained in Synthesis Examples 4, 9, 16 and 23. The results of measurements are shown in Table 3.

Comparative Example 9

The procedure of Example 33 was repeated except that the surface-treating agent was changed to γ-glycidoxypropyl-methoxysilane. The results of measurements are shown in Table 3.

EXAMPLES 37–40

The procedure of Example 29 was repeated except that the matrix resin was changed to a PBT and the surface-treating agent was changed to one of the aqueous carbodiimides obtained in Synthesis Examples 5, 10, 17 and 18. The results of measurements are shown in Table 3.

Comparative Example 10

The procedure of Example 37 was repeated except that the surface-treating agent was changed to γ-glycidoxypropyl-methoxysilane. The results of measurements are shown in Table 3.

TABLE 3

| | | Surface-treating agent | Synthesis Example | Matrix resin | Tensile strength (kg/mm²) | Bending strength (kg/mm²) |
|---|---|---|---|---|---|---|
| Example | 29 | Carbodiimide compound | 3 | PET | 17.4 | 27.7 |
| | 30 | " | 8 | " | 16.4 | 26.8 |
| | 31 | " | 15 | " | 16.5 | 26.9 |
| | 32 | " | 22 | " | 16.1 | 26.5 |
| Comparative Example | 8 | Silane coupling agent | | " | 12.9 | 22.6 |
| Example | 33 | Carbodiimide compound | 4 | Epoxy resin | 11.2 | 12.8 |
| | 34 | " | 9 | " | 10.5 | 11.5 |
| | 35 | " | 15 | " | 10.4 | 11.1 |
| | 36 | " | 23 | " | 10.7 | 12.4 |
| Comparative Example | 9 | Silane coupling agent | | " | 8.5 | 11.4 |
| Example | 37 | Carbodiimide compound | 5 | PBT | 13.3 | 19.6 |
| | 38 | " | 10 | " | 11.8 | 18.1 |
| | 39 | " | 17 | " | 12.5 | 18.9 |
| | 40 | " | 18 | " | 12.7 | 18.9 |
| Comparative Example | 10 | Silane coupling agent | | " | 10.9 | 17.2 |

EXAMPLE 41

Surface-treated aramid fibers were sprayed with a surface-treating agent which was the aqueous carbodiimide solution obtained in Synthesis Example 1. The resulting fibers were collected and made into a strand. The strand was wound in a cake form and dried at 80° C. for 1 hour. The amount of the surface-treating agent adhered was 0.5% by weight.

The strand was chopped and made into chopped strands each of 20 mm in length. The chopped strands were arranged at random in a mat form to obtain a chopped strand mat. The chopped strand mat was impregnated with a composite material matrix which was a polyethylene terephthalate resin (PET), to obtain a sheet material of 3 mm in thickness, made of an aramid fiber-reinforced polyethylene terephthalate resin (reinforcing material 40 wt %). Test pieces conforming to JIS K 6911 were cut out from the sheet and measured for properties. The results of measurements are shown in Table 4.

EXAMPLES 42–44

The procedure of Example 41 was repeated except that the surface-treating agent was changed to one of the aqueous carbodiimides obtained in Synthesis Examples 11, 12 and 19. The results of measurements are shown in Table 4.

Comparative Example 11

The procedure of Example 41 was repeated except that the surface-treating agent was changed to γ-glycidoxypropyl-methoxysilane. The results of measurements are shown in Table 4.

EXAMPLES 45–48

The procedure of Example 41 was repeated except that the matrix resin was changed to an epoxy resin and the surface-treating agent was changed to one of the aqueous carbodiimides obtained in Synthesis Examples 2, 6, 13 and 20. The results of measurements are shown in Table 4.

Comparative Example 12

The procedure of Example 45 was repeated except that the surface-treating agent was changed to γ-glycidoxypropyl-methoxysilane. The results of measurements are shown in Table 4.

EXAMPLES 49–52

The procedure of Example 41 was repeated except that the matrix resin was changed to a PET and the surface-treating agent was changed to one of the aqueous carbodiimides obtained in Synthesis Examples 3, 7, 14 and 21. The results of measurements are shown in Table 4.

Comparative Example 13

The procedure of Example 49 was repeated except that the surface-treating agent was changed to γ-glycidoxypropyl-methoxysilane. The results of measurements are shown in Table 4.

TABLE 4

| | | Surface-treating agent | Synthesis Example | Matrix resin | Tensile strength (kg/mm²) | Bending strength (kg/mm²) |
|---|---|---|---|---|---|---|
| Example | 41 | Carbodiimide compound | 1 | PET | 17.3 | 28.5 |
| | 42 | " | 11 | " | 16.6 | 27.6 |
| | 43 | " | 12 | " | 16.9 | 27.8 |
| | 44 | " | 19 | " | 17.5 | 28.2 |
| Comparative Example | 11 | Silane coupling agent | | " | 13.0 | 21.4 |
| Example | 45 | Carbodiimide compound | 2 | Epoxy resin | 11.5 | 12.7 |
| | 46 | " | 6 | " | 10.8 | 11.3 |

TABLE 4-continued

|  | Surface-treating agent | Synthesis Example | Matrix resin | Tensile strength (kg/mm$^2$) | Bending strength (kg/mm$^2$) |
|---|---|---|---|---|---|
| 47 | " | 13 | " | 10.7 | 11.0 |
| 48 | " | 20 | " | 10.8 | 12.0 |
| Comparative Example 12 | Silane coupling agent |  | " | 8.4 | 11.2 |
| Example 49 | Carbodiimide compound | 3 | PBT | 13.6 | 20.3 |
| 50 | " | 7 | " | 12.1 | 18.6 |
| 51 | " | 14 | " | 12.7 | 19.3 |
| 52 | " | 21 | " | 13.1 | 19.5 |
| Comparative Example 13 | Silane coupling agent |  | " | 10.6 | 17.0 |

EXAMPLE 53

A rock wool was sprayed with a surface-treating agent which was the aqueous carbodiimide solution obtained in Synthesis Example 4, and then was dried at 80° C. for 1 hour. The amount of the surface-treating agent adhered was 0.5% by weight.

The resulting rock wool was impregnated with a composite material matrix which was a polyethylene terephthalate resin, to obtain a sheet material of 3 mm in thickness, made of a rock wool-reinforced polyethylene terephthalate resin (reinforcing material: 40 wt %). Test pieces conforming to JIS K 6911 were cut out from the sheet and measured for properties. The results of measurements are shown in Table 5.

EXAMPLES 54–56

The procedure of Example 53 was repeated except that the surface-treating agent was changed to one of the aqueous carbodiimides obtained in Synthesis Examples 8, 15 and 22. The results of measurements are shown in Table 5.

Comparative Example 14

The procedure of Example 53 was repeated except that the surface-treating agent was changed to γ-glycidoxypropyl-methoxysilane. The results of measurements are shown in Table 5.

EXAMPLES 57–60

The procedure of Example 53 was repeated except that the matrix resin was changed to an epoxy resin and the surface-treating agent was changed to one of the aqueous carbodiimides obtained in Synthesis Examples 5, 9, 16 and 23. The results of measurements are shown in Table 5.

Comparative Example 15

The procedure of Example 57 was repeated except that the surface-treating agent was changed to γ-glycidoxypropyl-methoxysilane. The results of measurements are shown in Table 5.

EXAMPLES 61–64

The procedure of Example 53 was repeated except that the matrix resin was changed to a PBT and the surface-treating agent was changed to one of the aqueous carbodiimides obtained in Synthesis Examples 1, 10, 17 and 18. The results of measurements are shown in Table 5.

Comparative Example 16

The procedure of Example 61 was repeated except that the surface-treating agent was changed to γ-glycidoxypropyl-methoxysilane. The results of measurements are shown in Table 5.

TABLE 5

|  | Surface-treating agent | Synthesis Example | Matrix resin | Tensile strength (kg/mm$^2$) | Bending strength (kg/mm$^2$) |
|---|---|---|---|---|---|
| Example 53 | Carbodiimide compound | 4 | PET | 16.7 | 27.2 |
| 54 | " | 8 | " | 16.1 | 26.3 |
| 55 | " | 15 | " | 16.5 | 26.9 |
| 56 | " | 22 | " | 15.8 | 26.0 |
| Comparative Example 14 | Silane coupling agent |  | " | 12.8 | 22.5 |
| Example 57 | Carbodiimide compound | 5 | Epoxy resin | 11.8 | 14.0 |
| 58 | " | 9 | " | 10.9 | 13.2 |
| 59 | " | 16 | " | 11.0 | 13.4 |
| 60 | " | 23 | " | 10.8 | 13.1 |
| Comparative Example 15 | Silane coupling agent |  | " | 8.6 | 11.5 |
| Example 61 | Carbodiimide compound | 1 | PBT | 13.0 | 19.6 |
| 62 | " | 10 | " | 12.2 | 19.1 |
| 63 | " | 17 | " | 11.9 | 18.8 |
| 64 | " | 18 | " | 12.6 | 19.3 |
| Comparative Example 16 | Silane coupling agent |  | " | 10.7 | 16.9 |

What is claimed is:

1. A method of surface treating a reinforcing material, comprising contacting a reinforcing material with an aqueous surface-treating agent comprising a carbodiimide compound, wherein the carbodiimide compound is water-soluble or self-emulsifiable and is represented by the following formula $$Z-OOC-NH-(R_3-NCN)_n-R_3-NH-COO-Z$$

wherein $R_3$ is a residue of a diisocyanate compound selected from the group consisting of m- or p-tetramethylxylylene diisocyanate, 4,4'-dicyclohexylmethane diisocyanate, and isophorone diisocyanate;

Z is a residue of a poly(alkylene oxide) which has at least one reactive hydroxyl group and is blocked with an alkoxyl group at one terminal and which is represented by the following formula $$R_8-(O-CHR_9-CH_2)_m-OH$$

wherein $R_8$ is a lower alkyl group having 1–4 carbon atoms, $R_9$ is a hydrogen atom or a methyl group, and m is an integer of 4 to 30;

and n is an integer of 2 to 30, and wherein the reinforcing material is selected from the group consisting of glass fiber, carbon fiber and aramid fiber.

* * * * *